United States Patent [19]

Sullivan

[11] Patent Number: 4,590,828
[45] Date of Patent: May 27, 1986

[54] METAL CUTTING TOOL ADJUSTER AND COMPENSATOR

[75] Inventor: Jack O. Sullivan, Auburn Heights, Mich.

[73] Assignee: General Electric Company, Detroit, Mich.

[21] Appl. No.: 676,218

[22] Filed: Nov. 29, 1984

Related U.S. Application Data

[63] Continuation of Ser. No. 453,194, Dec. 27, 1982, abandoned.

[51] Int. Cl.⁴ .................. B23B 21/00; B23B 41/00
[52] U.S. Cl. ............................ 82/24 R; 82/1.2; 82/2 E
[58] Field of Search ............... 82/1.2, 2 E, 24 R, 2 B; 408/168, 171, 179, 161, 169, 170

[56] References Cited

U.S. PATENT DOCUMENTS

| | | | |
|---|---|---|---|
| 565,850 | 8/1896 | Fitzpatrick | 30/107 |
| 837,426 | 12/1906 | Seymour | 30/107 |
| 1,916,253 | 7/1933 | Buckley | 408/171 |
| 2,831,387 | 4/1958 | Ovshinsky | 82/24 R |
| 3,010,344 | 11/1961 | Christensen | 82/24 A |
| 3,566,239 | 2/1971 | Taniguchi | 318/593 |
| 3,740,161 | 6/1973 | Milewski | 408/158 |
| 4,128,794 | 12/1978 | Burleson | 318/603 |
| 4,148,235 | 4/1979 | Gerth | 82/21 R |
| 4,250,775 | 2/1981 | Jerue et al. | 82/1.2 |
| 4,406,194 | 9/1983 | Gersch | 82/36 R |
| 4,416,569 | 11/1983 | Yamakaoe et al. | 408/4 |
| 4,452,553 | 6/1984 | Kaminsky | 82/1.2 |

FOREIGN PATENT DOCUMENTS

| | | | |
|---|---|---|---|
| 701188 | 12/1953 | United Kingdom | 408/168 |
| 309576 | 7/1976 | U.S.S.R. | 408/154 |

*Primary Examiner*—Leonidas Vlachos
*Attorney, Agent, or Firm*—A. E. Bahr; E. F. Chapman

[57] ABSTRACT

A metal cutting tool holder and adjusting mechanism having a rotational drive; a housing and cam mounted therein for rotation by the rotational drive; a cam follower mounted on the cam for axial motion; a wedge block axially slidably contained in the housing and adapted to be moved axially by the cam follower; the wedge block having a tapered transverse surface; and a tool holder block transversely slidably contained in the housing and adjacent the wedge block; the tool holder block having a tapered surface thereon slidably engaging the tapered surface of the wedge block but which is a reverse taper compared to the taper of the wedge block, so that the rotation of the motor drives the wedge block axially, and the tapered surfaces cause the tool holder block to move in a radial direction of the wedge block. In alternative embodiments, unidirectional controls cause the rotational drive to move the wedge block in the opposite direction. The controls include a comparative voltage electrical control system. The device provides for tool adjustment for automatic control for metal cutting tools.

9 Claims, 3 Drawing Figures

METAL CUTTING TOOL ADJUSTER AND COMPENSATOR

CROSS-REFERENCE TO RELATED APPLICATION

This patent application is a continuation application of Ser. No. 453,194 filed Dec. 27, 1982, now abandoned.

BACKGROUND OF THE INVENTION

1. Field of the Invention

This invention relates to improvements in means and apparatus for accurately positioning and repositioning a metal cutting tool with respect to its workpiece, and more particularly to a combination of voltage sensing means and an adjustable wedge tool holder.

2. Description of the Prior Art

Various devices have been proposed for the positioning and repositioning of a metal cutting tool with respect to its proximity with a workpiece. In an ordinary lathe assembly the tool is mounted on a platform which is manually screw adjusted towards and away from the workpiece. In high speed, highly automatic production of similar parts, or where a number of cuts must be taken on the same part, the tool requires precise positioning and repositioning as well as wear compensation, so that all parts are made to the same size automatically.

One problem with such arrangements is that the support means for the cutting tool must be extremely rugged to prevent tool deflection and chatter or vibration. At the same time, a rugged assembly must be susceptible to quick and accurate adjustment. Certain devices, including stepping motor driven screws, hydraulic cylinders, and pivot bars all suffer from complexity, lack of a wide range of adjustment and need for fluid supply systems, among others.

BRIEF DESCRIPTION OF THE INVENTION

In accordance with one preferred embodiment of the invention, a mechanical transverse wedge device is employed as the tool holder and an electrical motor forces a predeterminedly shaped wedge or cam behind a spring return block means to position a tool.

DESCRIPTION OF THE INVENTION

Figure 1:
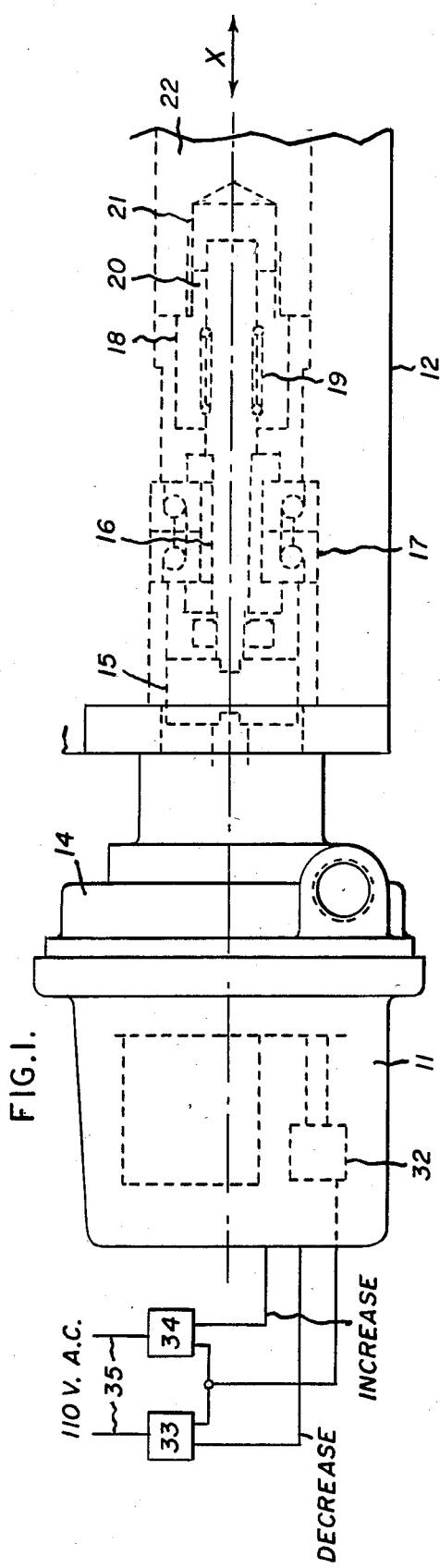
FIG. 1 is an assembly view of a tool compensation mechanism and a schematic electrical circuit therefor.

Referring now to FIG. 1, the compensator mechanism 10 comprises a reversible electric drive motor 11 and a mechanical drive means referred to herein as, adjusting mechanism 12. The drive motor 11 has electrically connected thereto a potentiometer 13 for electrical control and input. Motor 11 drives, through a usual gear reducer 14 and a coupling 15, the adjusting mechanism 12.

Mechanism 12 comprises a screw shaft 16 which is connected to coupling 15 and is rotatably supported by ball thrust bearings 17. The screw shaft 16 does not move axially. It is connected to the coupler 15 and rotates within bearing 17. At the end of screw shaft 16 there is a large ball nut 18 which is threaded on screw shaft 16. As known in the art, ball nut 18 rides on balls 19 which interfit between the threads on the screw shaft 16 and the internal threads of the nut 18. As a consequence, rotation of the screw shaft 16 by motor 11 causes the ball nut to travel axially along the screw shaft depending on the direction of rotation of the motor. The ball nut 18 has a threaded projecting portion 20 which threadedly engages a threaded opening 21 in a wedge block 22. Wedge block 22 is a part of the wedge adjusting means as illustrated in FIG. 2.

Figure 2:
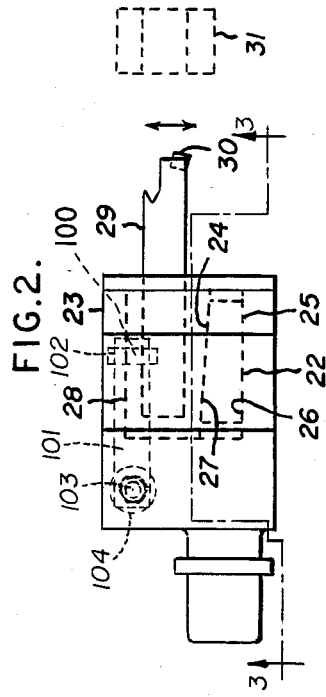
FIG. 2 is an illustration of the adjustable wedge assembly.

Referring now to FIG. 2, there is shown a simplified sketch of the wedge adjusting means of this invention. Wedge block 22 is laterally slidably contained within a housing 23. As illustrated, wedge block 22 is generally rectangularly shaped and has a tapered surface 24 and a straight surface 25. In this invention, the straight surface 25 bears against a straight surface 26 of the housing 23 while the tapered surface 24 bears against a complementarily tapered surface 27 on a tool holding block 28. Tool holding block 28 is also slidably contained within housing 23 but is slidable vertically as illustrated. A tool holder 29 has affixed thereto in the usual manner a cutting tool insert 30 which is adapted for a metal cutting operation on workpiece 31. It should be understood that the total assembly of FIG. 2 may also be multiangularly adjustable with respect to the workpiece 31. Tool holder 29 is suitably removably clamped in tool holder block 28. As can be understood thus far in this application, the motor 11 drives screw shaft 16 to cause ball nut 18 to move axially against wedge block 22 which also moves axially, and, the combination of the tapered surfaces 24 and 27 causes a camming action to move the tool holder 29, for example, vertically upwardly as viewed in FIG. 2.

In order to move the tool in an opposite direction, vertically downwardly, the motor is rotated in the opposite direction. Because of the threaded connections 20 and 21 the wedge block 22 is moved in a reverse direction.

Figure 3:
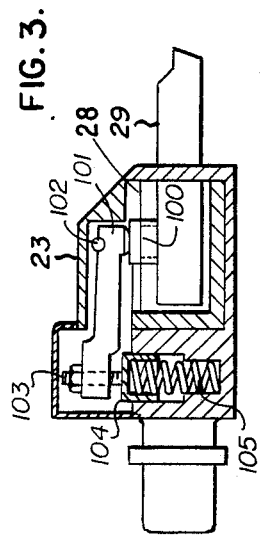
FIG. 3 is a side plan view of the adjustable wedge assembly.

It is important to have the wedge block 22 of sufficient size to provide ease of operation and rigidity. It is also important to have the tapered surfaces complementary to the required forces of wedge 22 and tool 29 movement. For example, in one practice of this invention the wedge block 22 was about 5.0 inches in length and about 3 inches in width. The taper was about 15-1. In this connection the motor drive means was rated about 0.05 HP, 117 VAC single phase reversible. The resultant force tending to move wedge block axially was about 20,000 lbs. In order to provide a positive biasing action on the wedge adjustment mechanism, a heavy spring device is employed to continuously push the block 28 against the housing 23 as well as against the tapered surface of wedge block 22. As shown in FIGS. 2 and 3, lever 101 which is pivoted at pivot pin 102, is utilized to provide a large mechanical advantage for the biasing action on the wedge adjustment mechanism. At one end of lever 101, force or pressure is applied by a heavy spring device through a compression spring 105 mounted in compression spring cup 104. An adjustable screw 103 is mounted on the lever 101 to control compression spring pressure. Ordinarily a heavy coil spring is utilized to apply a force through a lever 101 to provide a large mechanical advantage. The lever 101 acts on block 28 in a wedging fashion. As shown in the view of FIG. 3, coil spring 105 applies a force by compression spring cup 104 at adjustable screw 103 through lever 101 pivoted at pivot pin 102 to wedge 100 to transfer the direction of force to tool holder 29.

Some of the advantages of this invention include the overall ruggedness of the tool support and adjusting mechanism. The block and cam action provide both rigidity and preciseness of adjustment, particularly because there is a large range of motion in the motor and drive assembly relative to a small adjusting increment of travel for the tool 30. By this means tool 30 may travel an adjustment length of as much as 0.060 inch and with more accurate predictability. The cutting edge remains always on center over the adjustment range. The invention as described is adjustable for metalworking operations where the tool itself rotates. In this case, the device moves the total spindle to which the tool holder is attached. The system as described lends itself to a simplified electrical control system as schematically illustrated in FIG. 1.

Referring now again to FIG. 1, the control circuit includes a potentiometer 32 which, as illustrated in FIG. 1, is mechanically connected to the gear box in about a 200-1 ratio. This potentiometer is connected through a pair of voltage comparators 33 and 34 to a source of power 35. Briefly described, a given low voltage is impressed on potentiometer 32. A pick off takes a voltage off the potentiometer and feeds it to a further potentiometer included in one of the comparators. Depending on the difference in voltage, the comparators act to increase or decrease the adjustment by controlling the motor drive.

Although the subject invention has been described by reference to a preferred embodiment, it is apparent that other modifications could be devised by those skilled in the art that would fall within the scope and spirit of the subject invention as defined by the appended claims.

I claim:

1. A metal cutting tool holder and adjusting mechanism comprising in combination:
(a) rotational drive means;
(b) a housing and a cam means mounted therein for rotation by said rotational drive means;
(c) a cam follower means mounted on said cam means for axial motion therealong;
(d) a wedge block axially slidably contained in said housing and adapted to be moved axially by said cam follower means;
(e) said wedge block having a tapered transverse surface; and
(f) a tool holder block means transversely slidably contained in said housing and adjacent said wedge block;
(g) said tool holder block means having a tapered surface thereon slidably engaging the tapered surface of said wedge block but which is a reverse taper compared to the taper of said wedge block, said tapered surfaces being continuously maintained in contact by biasing means;
(h) so that the rotation of said rotational drive means drives the wedge block axially and said tapered surfaces cause said tool holder block to move in a non-pivotal radial direction relative to the axial movement of the wedge block.

2. The invention as recited in claim 1 wherein:
(a) said rotational drive means is an electrical motor;
(b) said cam means is a screw shaft; and
(c) said cam follower is a ball nut.

3. The invention as recited in claim 1 wherein the biasing means is a coil spring.

4. A metal cutting tool holder and adjusting mechanism comprising in combination:
(a) rotational drive means;
(b) a housing and cam means mounted therein for rotation by said rotational drive means;
(c) a cam follower means mounted on said cam means for axial motion therealong;
(d) a wedge block axially slidably contained in said housing and adapted to be moved axially by said cam follower means;
(e) said wedge block having a tapered transverse surface;
(f) a tool holder block means transversely slidably contained in said housing and adjacent said wedge block;
(g) said tool holder block means having a tapered surface thereon slidably engaging the tapered surface of said wedge block but which is a reverse taper compared to the taper of said wedge block, said tapered surfaces being continuously maintained in contact by biasing means;
(h) so that the rotation of said rotational drive means drives the wedge block axially and said tapered surfaces cause said tool holder to move in a non-pivotal radial direction relative to the axial movement of the wedge block; and
(i) means to unidirectionally control said drive means to move said wedge block in the opposite direction.

5. The invention as recited in claim 4 wherein:
(a) said rotational drive means is an electrical motor;
(b) said cam means is a screw shaft; and
(c) said cam follower is a ball nut.

6. The invention as recited in claim 4 wherein the biasing means is a coil spring.

7. A metal cutting tool holder and adjusting mechanism comprising in combination:
(a) rotational drive means;
(b) a housing and a cam means mounted therein for rotation by said rotational drive means;
(c) a cam follower means mounted on said cam means for axial motion therealong;
(d) a wedge block axially slidably contained in said housing and adapted to be moved axially by said cam follower means;
(e) said wedge block having a tapered transverse surface;
(f) a tool holder block means transversely slidably contained in said housing and adjacent said wedge block;
(g) said tool holder block means having a tapered surface thereon slidably engaging the tapered surface of said wedge block but which is a reverse taper compared to the taper of said wedge block, said tapered surfaces being continuously maintained in contact by biasing means;
(h) so that the rotation of said rotational drive means drives the wedge block axially and said tapered surfaces cause said tool holder block to move in a radial non-pivotal direction relative to the axial movement of the wedge block;
(i) means to unidirectionally control said drive means to move said wedge block in the opposite direction; and
(j) said control means including a comparative voltage electrical control system.

8. The invention as recited in claim 7 wherein:
(a) said rotational drive means is an electrical motor;
(b) said cam means is a screw shaft; and
(c) said cam follower is a ball nut.

9. The invention as recited in claim 7 wherein the biasing means is a coil spring.

* * * * *